United States Patent
Bernstein et al.

(10) Patent No.: US 9,386,446 B1
(45) Date of Patent: Jul. 5, 2016

(54) VEHICLE WIRELESS DEVICE STATUS INDICATOR AND INHIBITOR SYSTEM AND METHOD

(71) Applicants: James J. Bernstein, Haverford, PA (US); Jillian R H Bernstein, Haverford, PA (US); Joseph Bernstein, Haverford, PA (US)

(72) Inventors: James J. Bernstein, Haverford, PA (US); Jillian R H Bernstein, Haverford, PA (US); Joseph Bernstein, Haverford, PA (US)

(*) Notice: Subject to any disclaimer, the term of this patent is extended or adjusted under 35 U.S.C. 154(b) by 0 days.

(21) Appl. No.: 14/597,350

(22) Filed: Jan. 15, 2015

Related U.S. Application Data

(60) Provisional application No. 62/099,347, filed on Jan. 2, 2015.

(51) Int. Cl.
*H04M 3/00* (2006.01)
*H04W 8/22* (2009.01)

(52) U.S. Cl.
CPC ........................................ *H04W 8/22* (2013.01)

(58) Field of Classification Search
CPC ........................................................ H04W 8/22
USPC ............................................................. 455/419
See application file for complete search history.

(56) References Cited

U.S. PATENT DOCUMENTS

| | | | |
|---|---|---|---|
| 8,774,842 B2 | 7/2014 | Jones et al. | |
| 8,787,949 B2 | 7/2014 | Sumcad et al. | |
| 8,855,682 B2 | 10/2014 | Osann, Jr. | |
| 8,874,104 B1 | 10/2014 | Cope et al. | |
| 8,874,162 B2 | 10/2014 | Schrader et al. | |
| 8,884,750 B2 | 11/2014 | Bacal | |
| 2008/0070505 A1* | 3/2008 | Faltman | H04H 20/62 455/41.3 |
| 2013/0333143 A1* | 12/2013 | Boland | G06F 7/22 15/250.32 |
| 2014/0274023 A1 | 9/2014 | Rajeevalochana et al. | |
| 2014/0287733 A1 | 9/2014 | Mach | |
| 2014/0295792 A1 | 10/2014 | Makowski et al. | |
| 2014/0323109 A1 | 10/2014 | Spangler et al. | |
| 2014/0342717 A1 | 11/2014 | Chen et al. | |
| 2014/0342718 A1 | 11/2014 | Chen et al. | |

* cited by examiner

*Primary Examiner* — Tanmay Shah
(74) *Attorney, Agent, or Firm* — Caesar Rivise, PC

(57) ABSTRACT

A system and method that utilizes social scorn, enhanced law enforcement and/or the providing of contemporaneous status of a driver's wireless device to parents, employers or insurance companies to dissuade drivers from using the wireless device while driving. The system and method provide for detecting the presence of an enabled wireless device with a moving vehicle, displaying and/or recording the status of the wireless device for the purpose of dissuading and/or inhibiting operation of the communication mode of the wireless device during vehicle operation.

22 Claims, 2 Drawing Sheets

VEHICLE WIRELESS DEVICE STATUS INDICATOR AND INHIBITOR SYSTEM AND METHOD

CROSS-REFERENCE TO RELATED APPLICATIONS

This utility application claims the benefit under 35 U.S.C. §119(e) of Provisional Application Ser. No. 62/099,347 filed on Jan. 2, 2015 entitled VEHICLE WIRELESS DEVICE STATUS INDICATOR AND INHIBITOR SYSTEM AND METHOD and whose entire disclosure is incorporated by reference herein.

BACKGROUND OF THE INVENTION

The present invention generally relates to wireless device operation in vehicles and more particularly, to a system and method for detecting wireless device status within the vehicle and displaying and/or recording that status for the purpose of dissuading and/or inhibiting operation of the communication mode of the wireless device during vehicle operation.

U.S. Pat. No. 8,787,949 (Sumcad, et al.) discloses a method for controlling a mobile communications device while located in a mobile vehicle. U.S. Pat. No. 8,884,750 (Bacal) discloses inhibiting distracting operations of personal handheld devices by the operator of a vehicle. U.S. Pat. No. 8,855,682 (Osann, Jr.) discloses a system for safe texting while driving. U.S. Pat. No. 8,774,842 (Jones, et al.) discloses a system/method for limiting usage of a wireless communication device. See also U.S. Pat. No. 8,874,162 (Schrader, et al.) and U.S. Pat. No. 8,874,104 (Cope, et al.) and U.S. Patent Publication Nos. 2014/0342718 (Chen, et al.), 2014/0342717 (Chen, et al.), 2014/0323109 (Spangler, et al.), 2014/0287733 (Mach), 2014/0295792 (Makowski) and 2014/0274023 (Rajeevalochana).

However, there remains a need for a vehicle cell phone status detector and indicator and thereby inhibitor system and method.

All references cited herein are incorporated herein by reference in their entireties.

BRIEF SUMMARY OF THE INVENTION

A system for using social scorn, enhanced law enforcement and/or the providing of contemporaneous status of a driver's wireless device (e.g., cellphone, smartphone, tablet computer, etc.) to parents, employers and/or insurance companies to dissuade drivers from using the wireless device while driving; and whereby the system detects the presence of the enabled wireless device within a vehicle, records and/or displays the on-off status of features of the devices to dissuade the use of the wireless device while the vehicle is on is disclosed. The system comprises: a controller that communicates with the wireless device via an app loaded on the wireless device, and wherein the controller activates an inhibit mode of the wireless device to prevent the wireless device from enabling at least one user-selected wireless device feature; a display, in communication with the controller, which displays a status condition of the wireless device that can be seen through a window of the vehicle; and a recorder, in communication with the controller, and wherein the recorder continuously records the status of wireless device while the vehicle is on.

A method for using social scorn, enhanced law enforcement and/or the providing of contemporaneous status of a driver's wireless device (e.g., cellphone, smartphone, tablet computer, etc.) to parents, employers or insurance companies to dissuade drivers from using the wireless device while driving, whereby the method detects the presence of an enabled driver's wireless device within a vehicle while the vehicle is on is disclosed. The method comprises: registering at least one wireless device ID, via a wireless device app, with a controller onboard the vehicle; detecting, by the controller, the presence of the wireless device when the vehicle is on; activating an inhibit mode on the wireless device by the controller when the wireless device is detected by the controller to prevent the wireless device from enabling at least one user-selected wireless device feature; displaying, on a display visible through a vehicle window, by command of the controller the status of wireless device; and continuously recording the status of wireless device while the vehicle is on and transmitting such status to recipients of interest.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Figure 1:
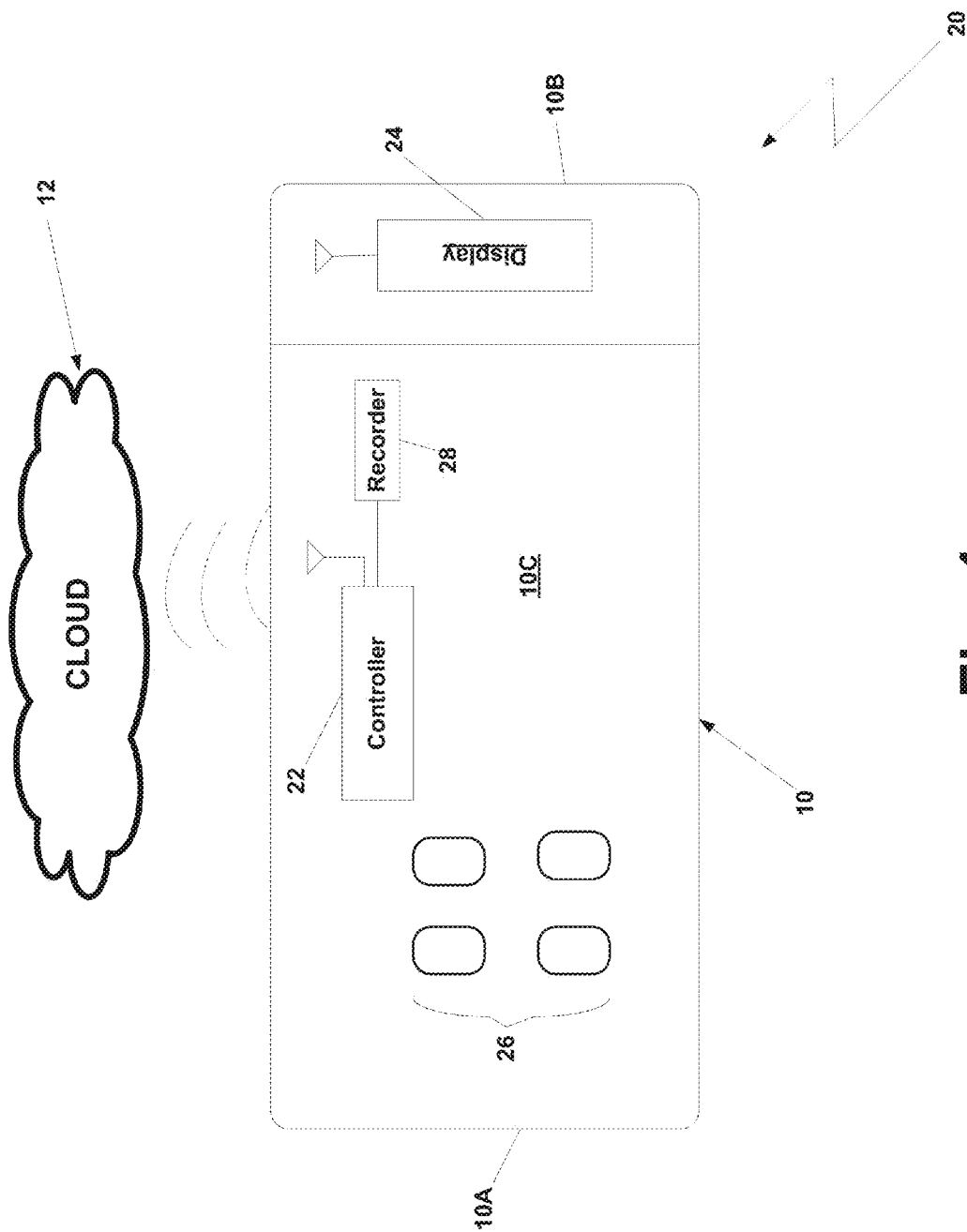
FIG. 1 is a functional diagram of the system of the present invention.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

FIG. 1 depicts a system and method 20 that provides for detecting the presence of an enabled wireless device with a moving vehicle, disabling the device during driving and enabling the device when driving is complete, and for reporting the on/off or enabled/disabled status of wireless devices within the vehicle. In particular, the system 20 comprises a controller 22, a display 24, one or more registered wireless devices 26 (e.g., cellphones, smartphones, tablets, etc.) and a virtual black box recorder 28 all located within the interior 10C of a vehicle 10, but not interfering with driver operation at the vehicle front end 10A.

Figure 2:
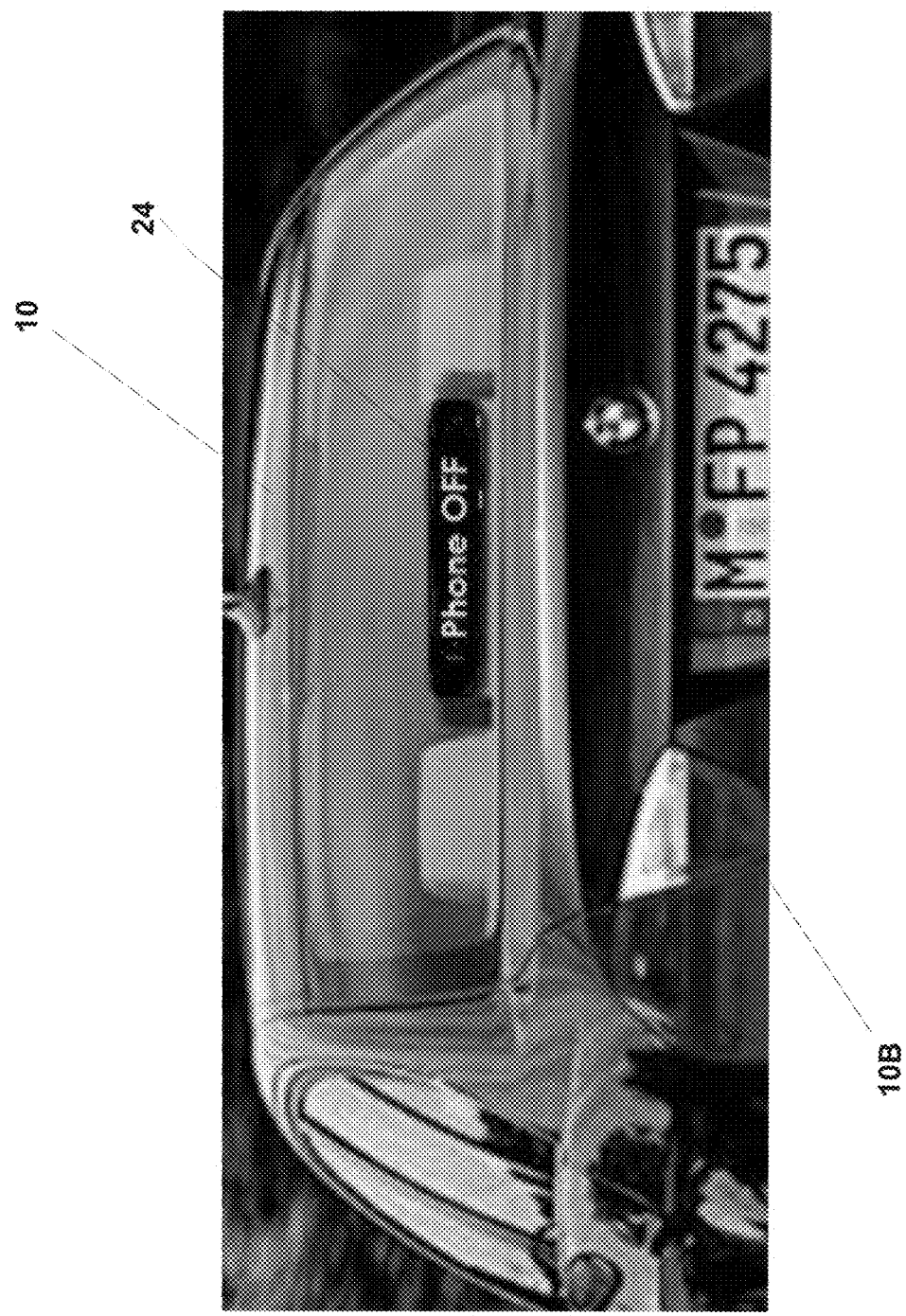
FIG. 2 is rear view of a sample vehicle showing the display of the present invention displaying the status of the wireless device present in the vehicle.

The controller 22, display 24 and recorder 26 are all connected to vehicle power. The display 24 is located at the rear 10B of the vehicle 10 and visible through the rear windshield, as shown by way of example in FIG. 2. The virtual black box recorder 26 comprises an event log that records which wireless devices 26 are inhibited or not when they are present in the vehicle 10. This log can be maintained in the cloud 12, on the wireless devices 26, on a land-based computer (not shown), or on a combination thereof. The recorder 26 receives data via an electronic connection to the controller 22.

The controller 22 passively inhibits all the registered devices 26 when they are present in the vehicle 10 and the vehicle ignition is on. The term "inhibit" is defined as disabling the wireless devices 26 to the extent defined by the user at the time of system set-up, ranging from "power off" to selective constraints of certain wireless device features (e.g., texting, phone communication, web access, etc.). For example, a user of the present invention 20 may select to disable web access, texting in both directions and outgoing calls yet allow incoming calls and music-playing to occur as normal.

The "inhibit mode" is a status of the registered device 26 such that in this mode all selected services are temporarily inhibited, including appropriate signaling being sent to parties attempting to text/call, etc.

The controller 22 transmits to the black box recorder 28 the status of all registered devices 26 while present in the vehicle 10; the recorder 28 maintains a log of such use. The controller 22 transmits to the display 24 an indication of the device 26 status; the display 24, in turn, displays a message (defined at the time of initialization) to reflect device status to viewers, including of course law enforcement officers, who can see the rear windshield of the vehicle 10.

To install the system 20, the controller 22 is first installed in the vehicle interior 10C while the display 24 is installed for easy viewing through the vehicle's rear windshield; and both are connected to vehicle power. The recorder 28 is also installed and coupled vehicle power. Next, using an app (not shown) on the wireless device 26, the user informs the controller 22 of all wireless device IDs (e.g., via Bluetooth or other wireless connections) to be monitored. Using an app or a web-based application, the black box recorder 28 software is associated with the specific controller 22 ID.

Using an app, each wireless device 26 can select which features are to be disabled during the inhibition mode (default is "power off"). The user can choose, for example, to limit use of email, text, phone, web, music play and others. These choices are then communicated to the controller 22 (via Bluetooth or other wireless connection). This app runs continuously in the background on the wireless device 26, for the purposes of receiving instructions from the controller 22, until the wireless device 26 is removed from the vehicle 10. Using an app, the user can define a message that will be displayed on display, as a function of device status, e.g. "My phone is stowed, is yours?" or "All devices are temporarily inhibited during driving" or "Phone is off" (see FIG. 2).

When vehicle ignition is turned on, controller 22 turns on and immediately detects whether any registered devices 26 are present in the vehicle 10. The controller 22 then sends a message to all registered devices 26 in the vehicle 10 confirming that the user of this device wishes to apply the usual inhibition status choices. The default setting is "yes" (i.e., assent is assumed if no response is received from the user in 1 minute). The controller 22 then loops every n minutes (default n=2). The controller 22 then sends a message to all registered devices 26 to enter the "inhibit mode." The devices' statuses are noted (i.e., all registered wireless devices 26 present in the vehicle 10 are assumed to be in the "inhibit mode" unless over-ridden by device itself). The status of each registered wireless device 26 is sent to the virtual black box recorder 28 and the display message is sent to the display 24 according the registered wireless device 26 status.

During system 20 operation, the app is running on the registered wireless device 26 in the background at all times, ready to communicate with the controller 22. When the controller 22 sends an initial message to the wireless device 26, the user can confirm the usual inhibition status choices or override (default=confirm). When the controller 22 sends a message to all registered devices 26 to enter the "inhibit mode", the device 26 enters the "inhibit mode" and stays there for n minutes (such that, if no repeat signal is sent from the controller 22, the device 26 reverts to full function in n+1 minutes). The controller 22 commands the display 24 to indicate the pertinent display message indicating the inhibition status. At any time, the user can use the app to override the "inhibit mode", which also informs the controller 22 that this was done. The controller 22 therefore updates the display 24 with the corresponding wireless device 26 status. Therefore, at all times, the display 24 message is controlled by the controller 22. Similarly, the virtual black box recorder 28 is recording, at all times, the status of the vehicle and the status of each of the registered wireless devices 26 present in the vehicle 10.

The thrust of the present invention is utilize "social scorn" (e.g., from fellow drivers seeing the wireless device status provided on the display), greater law enforcement (viz., from traffic police viewing the display) as well as greater external incentives (e.g., from parents, employers, insurance company monitoring the data being recorded, etc.) to achieve the end result: stopping drivers from using wireless devices while in the vehicle. Using available wireless technologies and hardware, the system and method of the present invention provide a technology platform that gives a mechanism for social scorn to dissuade drivers from using wireless technology during driving; enhances law enforcement by providing them with a quick and reliable status indicator of a driver's wireless devices during driving; and provides others who have a strong interest in limiting the driver's use of devices during driving (e.g., parents, employers, insurance companies, etc.) with the same data.

While the invention has been described in detail and with reference to specific examples thereof, it will be apparent to one skilled in the art that various changes and modifications can be made therein without departing from the spirit and scope thereof.

What is claimed is:

1. A system for using social scorn, enhanced law enforcement and/or the providing of contemporaneous status of a driver's wireless device to parents, employers and/or insurance companies to dissuade drivers from using the wireless device while driving, whereby the system detects the presence of an enabled wireless device within a vehicle, records and/or displays the on-off status of features of the device thereby dissuading the use of the wireless device while the vehicle is on, said system comprising:
   a controller that communicates with the wireless device via an app loaded on the wireless device, said controller activating an inhibit mode of the wireless device to prevent the wireless device from enabling at least one user-selected wireless device feature;
   a display, in communication with said controller, which displays a status condition of the wireless device that can be seen through a window of the vehicle; and
   a recorder, in communication with said controller, said recorder continuously recording the status of wireless device while the vehicle is on.

2. The system of claim 1 further comprising a communication link between said controller and the cloud, said communication link permitting vehicle data and wireless device status to be stored remotely from said recorder or transmitted to recipients of interest.

3. The system of claim 1 wherein said wireless device may comprise one from the group of cellphones, smartphones and computer tablets.

4. The system of claim 1 wherein the window of the vehicle is the rear windshield.

5. The system of claim 1 wherein said controller communicates with said display using a wireless link.

6. The system of claim 1 wherein said controller communicates with said recorder using a wireless link.

7. The system of claim 1 wherein said controller, said display and said recorder are coupled to vehicle power.

8. A method for using social scorn, enhanced law enforcement and/or the providing of contemporaneous status of a driver's wireless device to parents, employers or insurance companies to dissuade drivers from using the wireless devices while driving, whereby the method detects the presence of the enabled driver's wireless device within a vehicle, said method comprising:
- registering at least one wireless device ID, via a wireless device app, with a controller onboard the vehicle;
- detecting, by said controller, the presence of the wireless device when the vehicle is on;
- activating an inhibit mode on the wireless device by the controller when the wireless device is detected by the controller to prevent the wireless device from enabling at least one user-selected wireless device feature;
- displaying, on a display visible through a vehicle window, by command of said controller the status of wireless device; and
- continuously recording the status of wireless device while the vehicle is on.

9. The method of claim 8 further comprising communicating vehicle data and wireless device status data from said controller to the cloud for remotely storing said data.

10. The method of claim 8 wherein said wireless device may comprise one from the group of cellphones, smartphones and computer tablets.

11. The method of claim 8 wherein said displaying step comprises displaying said wireless device status through the rear windshield.

12. The method of claim 8 wherein said controller communicates with said display using a wireless link.

13. The method of claim 8 wherein said controller communicates with said recorder using a wireless link.

14. The method of claim 8 wherein said displaying step comprises said controller updating said display whenever the wireless device status changes.

15. The method of claim 8 wherein said app continuously runs in the background on said wireless device for receiving instructions from said controller.

16. The method of claim 8 wherein turning on the ignition of the vehicle initiates said controller detecting the presence of any registered wireless devices in said vehicle.

17. The method of claim 16 wherein said controller activates said inhibit mode automatically on said wireless device if said controller receives no response from said wireless device within a predetermined time.

18. The method of claim 17 wherein said predetermined period is one minute.

19. The method of claim 17 wherein said controller loops to repeatedly transmit an inhibit mode activation at a predetermined period.

20. The method of claim 19 wherein said predetermined period is every two minutes.

21. The method of claim 19 wherein said wireless device reverts to an uninhibited mode if said wireless device fails to receive said inhibit mode activation command within a second predetermined period.

22. The method of claim 21 wherein said predetermined period comprises three minutes.

* * * * *